(12) United States Patent
Ukai

(10) Patent No.: US 9,586,543 B2
(45) Date of Patent: Mar. 7, 2017

(54) ELECTRIC VEHICLE

(71) Applicant: HONDA MOTOR CO., LTD., Tokyo (JP)

(72) Inventor: Nobuchika Ukai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 500 days.

(21) Appl. No.: 14/351,747

(22) PCT Filed: Nov. 16, 2012

(86) PCT No.: PCT/JP2012/079763
§ 371 (c)(1),
(2) Date: Apr. 14, 2014

(87) PCT Pub. No.: WO2013/073661
PCT Pub. Date: May 23, 2013

(65) Prior Publication Data
US 2014/0232184 A1    Aug. 21, 2014

(30) Foreign Application Priority Data

Nov. 17, 2011  (JP) .................. 2011-251646

(51) Int. Cl.
*B60K 1/04*    (2006.01)
*B60R 16/03*   (2006.01)
(Continued)

(52) U.S. Cl.
CPC ............. *B60R 16/03* (2013.01); *B60K 1/00* (2013.01); *B60R 16/0215* (2013.01); *B60K 1/04* (2013.01);
(Continued)

(58) Field of Classification Search
CPC ...... B60K 1/00; B60K 1/04; B60K 2001/003; B60K 2001/005; B60K 2001/0411;
(Continued)

(56) References Cited

U.S. PATENT DOCUMENTS 6,188,574 B1  2/2001 Anazawa
7,051,825 B2  5/2006 Masui et al.
(Continued)

FOREIGN PATENT DOCUMENTS

CN   1572559 A   2/2005
EP   2380780 A1  10/2011
(Continued)

OTHER PUBLICATIONS

Office Action dated Oct. 19, 2015, issued in counterpart Chinese Application No. 201280048415.5, with Partial English translation. (8 pages).
(Continued)

*Primary Examiner* — Levi Gannon
(74) *Attorney, Agent, or Firm* — Westerman, Hattori, Daniels & Adrian, LLP

(57) ABSTRACT

An electric vehicle 10 includes: an electric device unit 30 arranged on a floor tunnel 21 and having plural electric devices 40 accommodated therein; and conductive cables 49, 51 and a cooling pipe 52 that respectively extend from a first motor 13, a second motor 16, and a radiator, and are connected to the electric device unit 30. Connection portions 45, 46 of the electric device unit 30, to which the conductive cables 49, 51 and the cooling pipe 52 are connected, respectively penetrate openings 37, 38 formed in a floor panel 20, and are arranged under the floor panel 20.

6 Claims, 8 Drawing Sheets

(51) Int. Cl.
  *B62D 25/20* (2006.01)
  *B60K 1/00* (2006.01)
  *B60R 16/02* (2006.01)
  *B60K 13/04* (2006.01)

(52) U.S. Cl.
  CPC ........ *B60K 13/04* (2013.01); *B60K 2001/003* (2013.01); *B60K 2001/0416* (2013.01); *B60Y 2400/61* (2013.01); *B62D 25/20* (2013.01)

(58) Field of Classification Search
  CPC ........ B60K 2001/0416; B60R 16/0207; B60R 16/0215; B60R 16/03; B62D 25/20
  USPC .................................................. 307/9.1, 10.1
  See application file for complete search history.

(56) References Cited

U.S. PATENT DOCUMENTS

| | | | |
|---|---|---|---|
| 8,444,216 | B2 | 5/2013 | Yamaguchi et al. |
| 2004/0235315 | A1 | 11/2004 | Masui et al. |
| 2006/0121795 | A1 | 6/2006 | Hashimura et al. |
| 2008/0315572 | A1 | 12/2008 | Hashimura et al. |
| 2010/0101881 | A1* | 4/2010 | Yoda ........................ B60K 1/04 180/68.5 |
| 2011/0233969 | A1 | 9/2011 | Yamaguchi et al. |
| 2012/0055722 | A1* | 3/2012 | Matsuzawa ............... B60K 1/04 180/65.21 |
| 2012/0244746 | A1* | 9/2012 | Tsuge ................... H01R 13/631 439/571 |

FOREIGN PATENT DOCUMENTS

| | | |
|---|---|---|
| JP | 2005-132348 A | 5/2005 |
| JP | 2007-290616 A | 11/2007 |
| JP | 2008-254607 A | 10/2008 |
| JP | 2010-143436 A | 7/2010 |
| WO | 2010070834 A1 | 6/2010 |
| WO | 2012/043263 A1 | 4/2012 |

OTHER PUBLICATIONS

International Search Report for PCT/JP2012/079763, Mailing Date of Jan. 22, 2013.

* cited by examiner

ELECTRIC VEHICLE

TECHNICAL FIELD

The present invention relates to an electric vehicle, and in particular, to an electric vehicle such as an electric automobile and a hybrid automobile in which an electric device arranged in a vehicle cabin is connected to an external device by a routing member such as a conductive cable.

BACKGROUND ART

As a hybrid automobile and an electric automobile, there has been known an electric vehicle in which a high-voltage device such as an inverter and a battery pack is accommodated in a vehicle cabin (see PTLs 1, 2). PTL 1 discloses a vehicle in which the high-voltage device is provided in a central area in the vehicle cabin that is located on a front side of a rear seat and a rear side of a prime mover compartment, and the high-voltage device is connected by a high-voltage cable to a front-side device arranged in the prime mover compartment. The high-voltage cable, which is connected at one end with the front-side device, runs under a floor panel, and is routed upwardly by penetrating through a hole provided in the floor panel from the bottom side so as to be connected to the high-voltage device in the vehicle cabin.

PTL 2 discloses a vehicle in which a battery pack is mounted in a console box arranged between a driver seat and a passenger seat. A cold air duct is connected to the console box for cooling down the battery pack, which is performed by discharging a part of the cold air into the console box, thereby adjusting a temperature.

CITATION LIST

Patent Literature

PTL 1: JP-2007-290616-A
PTL 2: JP-2008-254607-A

SUMMARY OF INVENTION

Technical Problem

In the vehicle described in PTL 1, the high-voltage device arranged in the vehicle cabin is connected to the front-side device arranged in the prime mover compartment by the high-voltage cable. Thus, a complex work is required for causing the high-voltage cable to penetrate the hole provided in the floor panel and connecting it to the high-voltage device in the vehicle cabin while being routed onto the floor. Accordingly, the workability is low, and there is room for improvement. Although PTL 2 does not mention a connection of a cable to the battery pack in the console box, there is a similar problem.

The invention has been made in view of the above problem, and therefore an object thereof is to provide an electric vehicle capable of facilitating a connecting work between a routing member that is connected at one end to an external device and an electric device unit arranged in a vehicle cabin so as to improve work efficiency.

Solution to Problem

To achieve the above object, Claim 1 defines an electric vehicle including:

an electric device unit (e.g., an electric device unit 30 in embodiment) which includes plural electric devices (e.g., an electric device 40 in embodiment) and an electric device accommodation case (e.g., an electric device accommodation case 31 in embodiment) accommodating the plural electric devices and which is arranged on a floor panel (e.g., a floor panel 20 in embodiment) of a vehicle (e.g., an electric vehicle 10 in embodiment); and at least one routing member formed of a conductive cable (e.g., conductive cables 49, 51 in embodiment) or a cooling pipe (e.g., a cooling pipe 52 in embodiment) which extends from an external device a first motor 13, a second motor 16, and a radiator in embodiment) and which is connected to the electric device unit, wherein an opening (e.g., a front opening 37 and a rear opening 38 in embodiment) is formed in the floor panel at a position where the electric device unit is arranged, and wherein a connection portion (e.g., a front-side connection portion 45 and a rear-side connection portion 46 in embodiment) of the electric device unit to which the routing member is connected is arranged under the floor panel.

Claim 2 defines, based on Claim 1, the electric vehicle, wherein the electric device accommodation case includes an accommodation portion (e.g., an accommodation portion 34 in embodiment) which accommodates the plural electric devices and which is positioned on the floor panel and an extension portion (e.g., a front extension portion 35 and a rear extension portion 36 in embodiment) which penetrates the opening from the accommodation portion, which extends under the floor panel and to which the connection portion is provided.

Claim 3 defines, based on Claim 1 or 2, the electric vehicle, wherein the connection portion is formed such that a connection direction thereof with the routing member is parallel or obliquely downward.

Claim 4 defines, based on any one of Claims 1 to 3, the electric vehicle, wherein the electric device unit is arranged on a top face of a floor tunnel (e.g., a floor tunnel 21 in embodiment) which is formed by the floor panel, and wherein a lower face (e.g., lower faces 35a, 36a in embodiment) of the extension portion of the electric device unit is positioned in a recessed space (e.g., a recessed space S in embodiment) configured by the floor tunnel.

Claim 5 defines, based on any one of Claims 1 to 4, the electric vehicle, wherein the electric device unit is arranged in a central portion (e.g., a vehicle cabin 18 in embodiment) in a vehicle longitudinal direction, wherein the external device is arranged in a front (e.g., in a prime mover compartment 11 in embodiment) and a rear (e.g., in a motor accommodation compartment 14 in embodiment) in the vehicle longitudinal direction with respect to the electric device unit, wherein a front opening and a rear opening are formed in the floor panel respectively at a front position and a rear position in a portion where the electric device unit is arranged, and wherein the connection portion includes a front-side connection portion and a rear-side connection portion which are arranged under the floor panel so as to be separated from each other in the vehicle longitudinal direction with respect to the electric device unit.

Claim 6 defines, based on any one of Claims 1 to 5, the electric vehicle, wherein the routing member includes the conductive cable and the cooling pipe which are aligned in a vehicle width direction and which extend in the vehicle longitudinal direction, wherein an exhaust pipe (e.g., an exhaust pipe 55 in embodiment) which discharges exhaust gas from an engine (e.g., an engine 12 in embodiment) is provided under the conductive cable and the cooling pipe, and, wherein, when seen in the vehicle longitudinal direction, the conductive cable is arranged on an opposite side of the cooling pipe from a side to which the exhaust pipe moves in the vehicle width direction upon a collision of the vehicle.

Advantageous Effects of Invention

According to Claim 1, the electric device unit can easily be connected to the routing member from a lower face side of the vehicle. Therefore, work efficiency can be improved.

According to Claim 2, in the electric device accommodation case, the connection portion, which is provided in the extension portion, penetrates the opening of the floor panel and is arranged under the floor panel. Therefore, the work efficiency of connection between the electric device unit and the routing member can be improved.

According to Claim 3, the floor panel does not become an obstacle, and therefore, the routing member can easily be connected to the electric device unit.

According to Claim 4, since the extension portion of the electric device unit is accommodated in the recessed space of the floor tunnel, the floor tunnel can protect the electric device unit.

According to Claim 5, the front and rear external devices can efficiently be connected to the electric device unit by the short routing member.

According to Claim 6, even when the exhaust pipe moves upon the collision of the vehicle, probability of interference between a catalyst device provided in the exhaust pipe and the conductive cable is suppressed. Therefore, damage to the conductive cable can be prevented.

MODE FOR CARRYING OUT THE INVENTION

Figure 1:
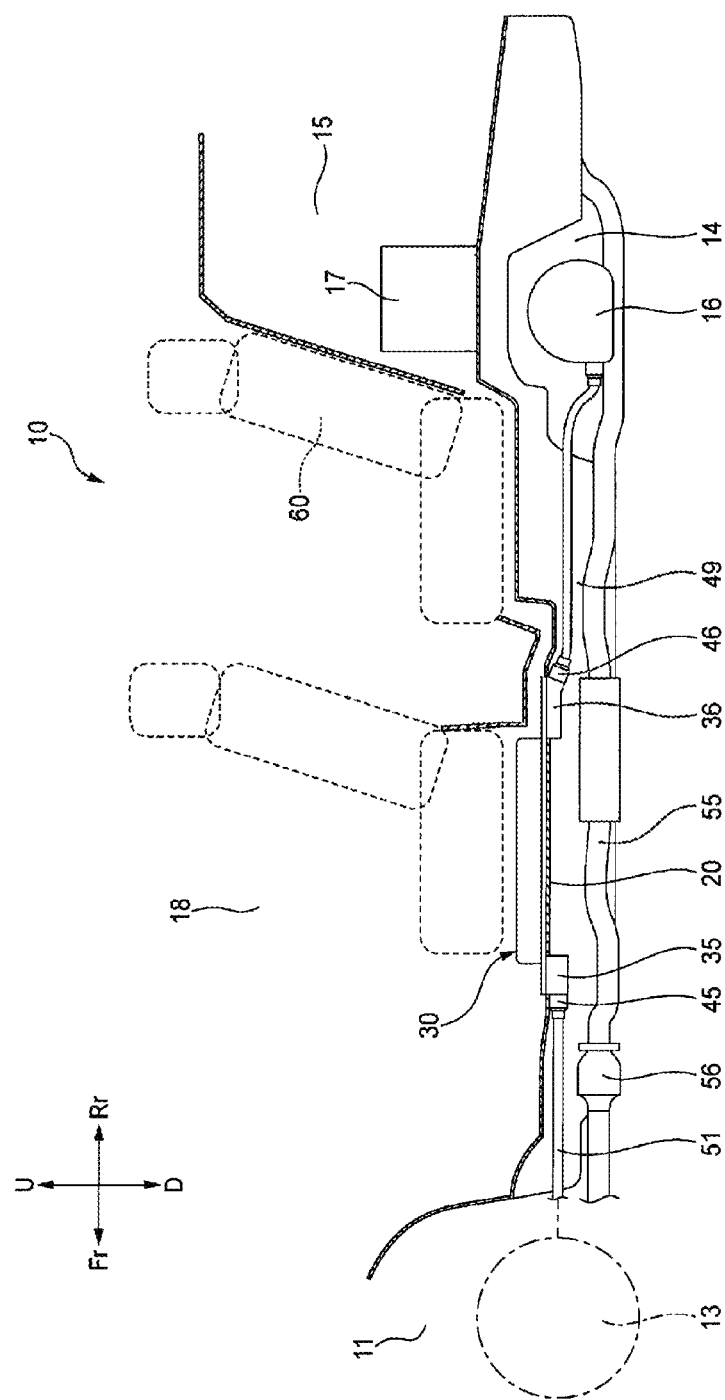
FIG. 1 is a vertical cross-sectional view of an electric vehicle according to the invention at center in a vehicle width direction.

An electric vehicle according to an embodiment of the invention will be described in detail with reference to the drawings. In the drawings, Fr, Rr, U, D, L, and R respectively indicate front, rear, upward, downward, left, and right.

Figure 2:
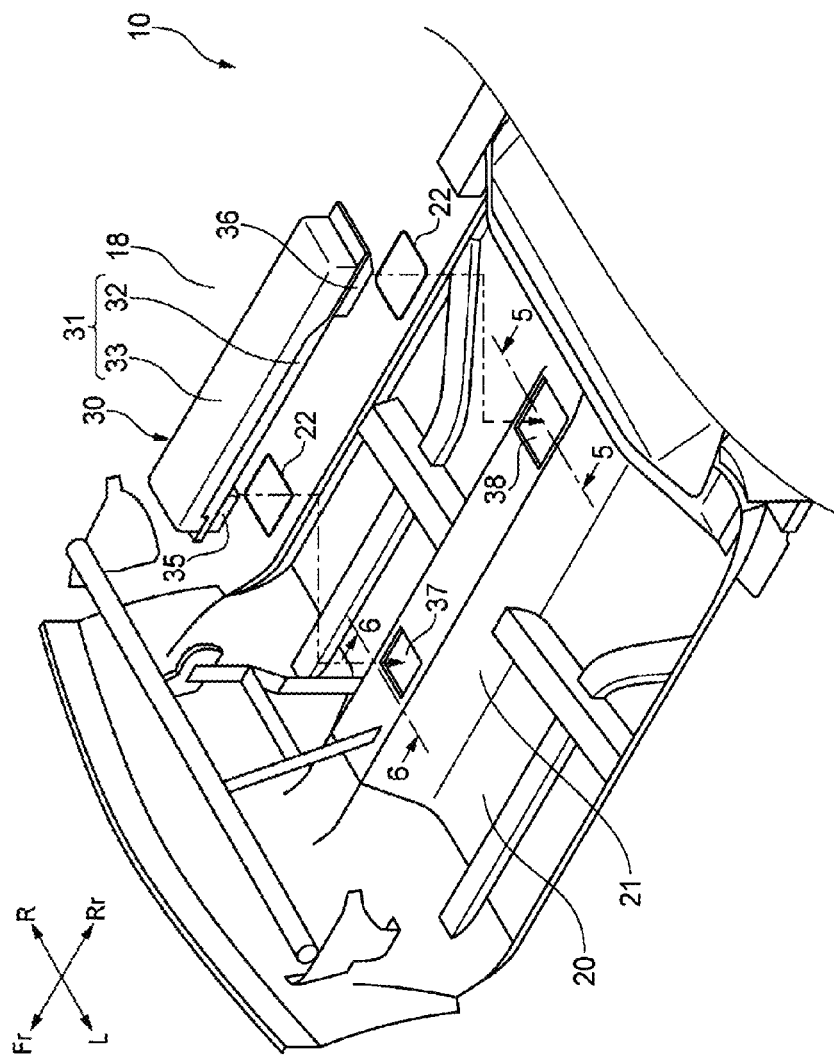
FIG. 2 is a perspective view of main components of the electric vehicle shown in FIG. 1.

As shown in FIG. 1 and FIG. 2, an electric vehicle 10 of this embodiment is a hybrid automobile. For example, in a prime mover compartment 11 in a front portion of the vehicle, a power unit 19 having an engine 12 (see FIG. 7) and a first motor 13 as external devices and an unillustrated radiator are arranged. In a motor accommodation compartment 14 and a luggage space 15 in a rear portion of the vehicle, a second motor 16 and a battery 17 as the external devices are respectively arranged. In a vehicle cabin 18 as a central portion in a longitudinal direction of the vehicle 10, an electric device unit 30 is arranged on a top face of a floor tunnel 21 that is formed between a driver seat and a passenger seat by a floor panel 20. The first and second motors 13, 16 are each configured by a three-phase AC motor, for example.

The electric device unit 30 includes an inverter, a DC-DC converter, and the like for constituting plural electric devices 40, obtains DC power from the battery 17, and converts the DC power to three-phase AC power to drive the first and second motors 13, 16, while converting regenerative power from the first and second motors 13, 16 to charge the battery 17. Since a DC voltage converted by the inverter is a high voltage, a part thereof is lowered by the DC-DC converter.

Accordingly, the thus-configured hybrid automobile 10 can travel in an engine drive mode in which the vehicle is driven by the engine 12, a motor drive mode in which the vehicle is driven by the first and second motors 13, 16, and an assisted drive mode in which the first and second motors 13, 16 assist generation of a driving force when the vehicle travels by the engine. The regenerative power of the first and second motors 13, 16 is converted to the DC power to charge the battery 17.

Figure 3:
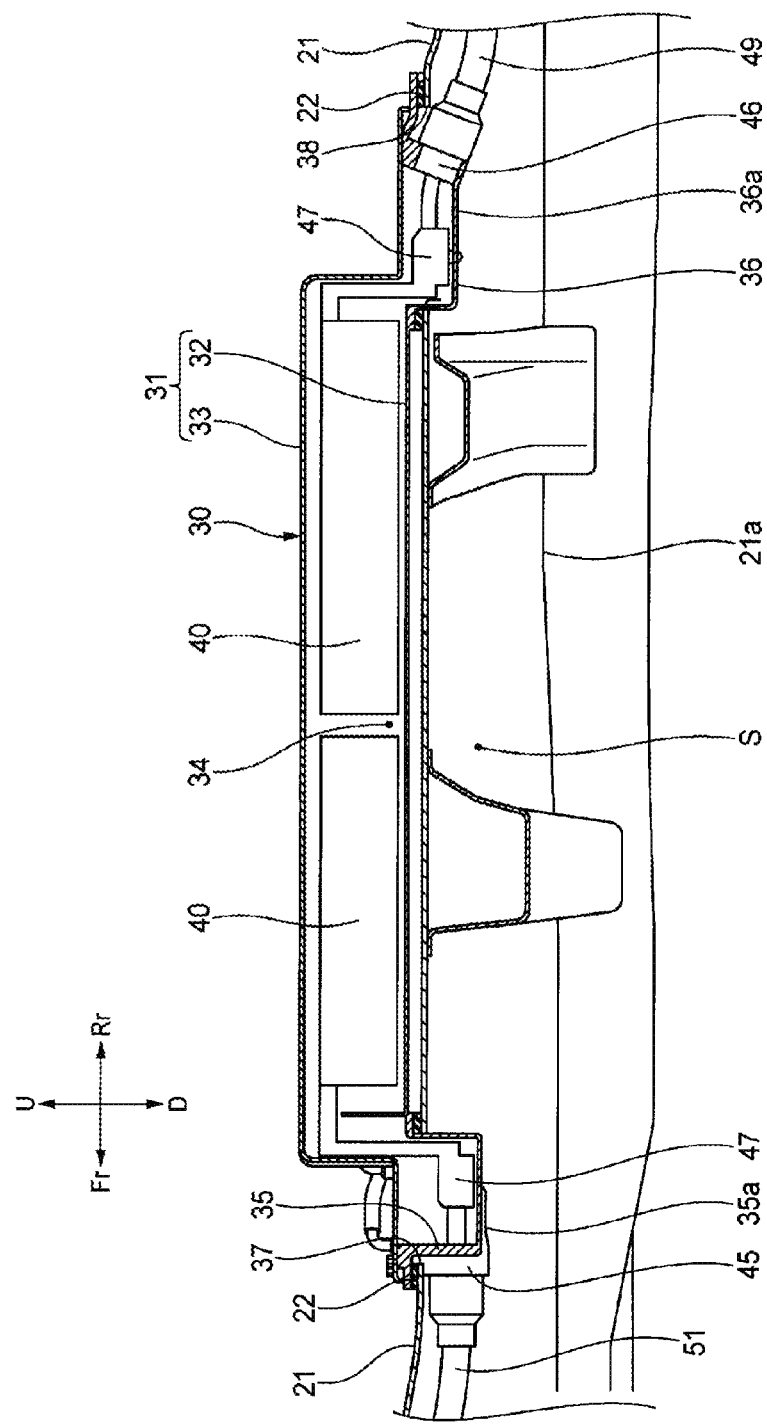
FIG. 3 is cross-sectional view of an electric device unit arranged on a top face of a floor tunnel

Also referring to FIG. 3, the electric device unit 30 includes the plural electric devices 40 for driving the first and second motors 13, 16 and an electric device accommodation case 31 for accommodating the plural electric devices 40. The electric device accommodation case 31 includes: a case main body 32 having an accommodation portion 34 that is positioned on the floor panel 20 as well as a front extension portion 35 and a rear extension portion 36 that respectively project downward from a front side and a rear side of the accommodation portion 34; and a lid body 33 that covers the accommodation portion 34, the front extension portion 35, and the rear extension portion 36 from above and cooperates with the case main body 32 to create an accommodation space for accommodating the plural electric devices 40.

A front opening 37 and a rear opening 38 for communicating between the vehicle cabin 18 and an area under the floor panel 20 are respectively formed in a front position and a rear position of the floor tunnel 21 on which the electric device unit 30 is arranged. The front extension portion 35 and the rear extension portion 36 of the electric device unit 30 are arranged to respectively penetrate the front and rear openings 37, 38 and project under the floor panel 20.

Figure 5:
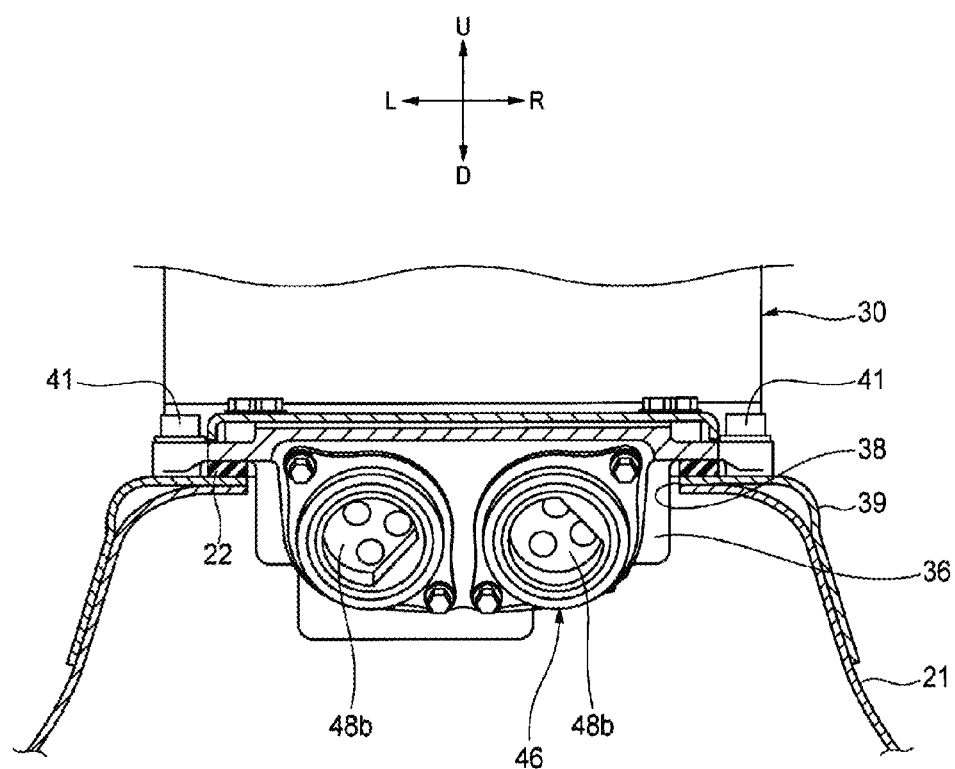
FIG. 5 is a cross-sectional view taken along the line 5-5 in FIG. 2 without showing the exhaust pipe.

A packing 22 is interposed between the front extension portion 35, which projects under the floor panel 20, and a periphery of the front opening 37 of the floor panel 20, and is also interposed between the rear extension portion 36, which projects under the floor panel 20, and a periphery of the rear opening 38 of the floor panel 20. Accordingly, the front opening 37 and the rear opening 38 are sealed (see FIG. 5 and FIG. 6). Plural bolts 41 are fastened in this state to fix the electric device unit 30 to the top face of the floor tunnel 21. A reference numeral 39 in FIG. 5 and FIG. 6 denotes a floor reinforcing member for reinforcing the floor panel 20.

The front extension portion 35 is provided with a front-side connection portion 45 having: a cable connector 48a for connecting a conductive cable 51 (a routing member) that extends from the first motor 13; and two pipe connectors 50 to which two cooling pipes 52 (the routing members) extending from the unillustrated radiator are connected. The rear extension portion 36 is provided with a rear-side connection portion 46 having two cable connectors 48b for connecting two conductive cables 49 (the routing members) that extend from the second motor 16. Wires that respectively extend from the cable connectors 48a, 48b into the front and rear extension portions 35, 36 are each connected to the electric device 40 via a terminal block 47.

The conductive cables 49, 51 supply the three-phase power from the electric device unit 30 to the first motor 13 and the second motor 16, respectively. The two cooling pipes 52 circulate cooling water between the radiator and the electric device unit 30 to cool the electric device unit 30.

Lower faces 35a, 36a of the front and rear extension portions 35, 36 are positioned in a recessed space S that is configured by the floor tunnel 21, and the front and rear extension portions 35, 36 are accommodated in the recessed space S of the floor tunnel 21. Accordingly, the front and rear extension portions 35, 36, that is, the front-side and rear-side connection portions 45, 46 are protected by the floor tunnel 21. In this embodiment, the recessed space S is a space that is configured by the floor tunnel 21 and positioned above an opening position 21a of the floor tunnel 21.

As shown in FIG. 3, the front-side connection portion 45, in which the cable connector 48a is arranged, is formed such that a connection direction thereof with the conductive cable 51 is parallel, while the rear-side connection portion 46, in which the two cable connectors 48b are arranged, is formed such that a connection direction thereof with the two conductive cables 49 is obliquely downward. This configuration can be achieved because the floor panel 20 is formed to be slightly inclined upward-frontward in the front in the vehicle longitudinal direction with respect to the electric device unit 30. Accordingly, even when the connection direction of the cable connector 48a with the conductive cable 51 is set to be parallel, the floor panel 20 does not become an obstacle, and thus the conductive cable 51 can easily be connected. In the rear in the vehicle longitudinal direction with respect to the electric device unit 30, the floor panel 20 is formed to be inclined downward to the rear for a purpose of improving comfortableness of a passenger seated on a rear seat 60. Accordingly, even when the connection direction of the cable connector 48b with the conductive cables 49 is set to be obliquely downward, the floor panel 20 does not becomes the obstacle, and thus the two conductive cables 49 can easily be connected.

Figure 4:
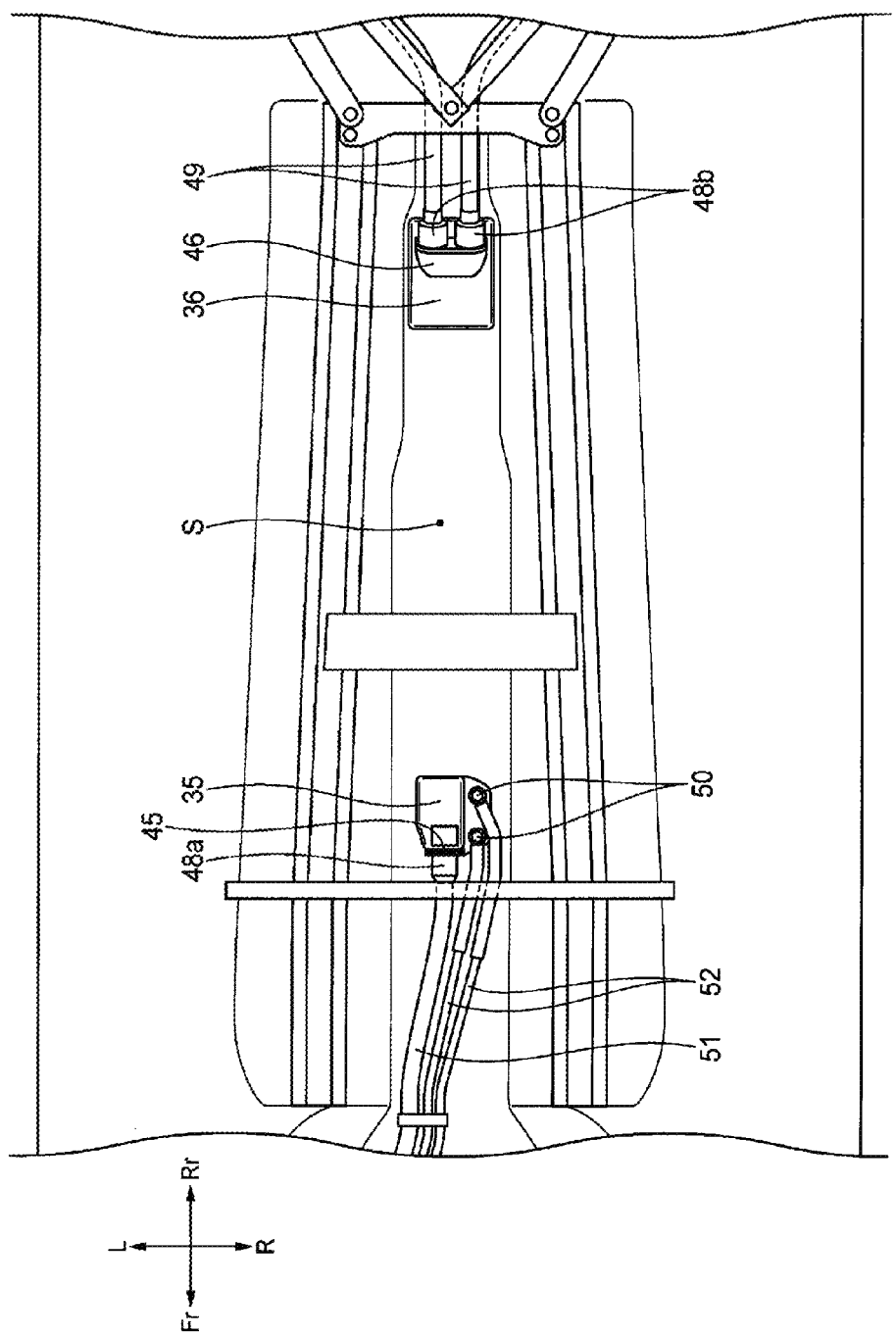
FIG. 4 is a back view of the electric vehicle for showing a connection state between the electric device unit and a routing member without showing an exhaust pipe.
Figure 6:
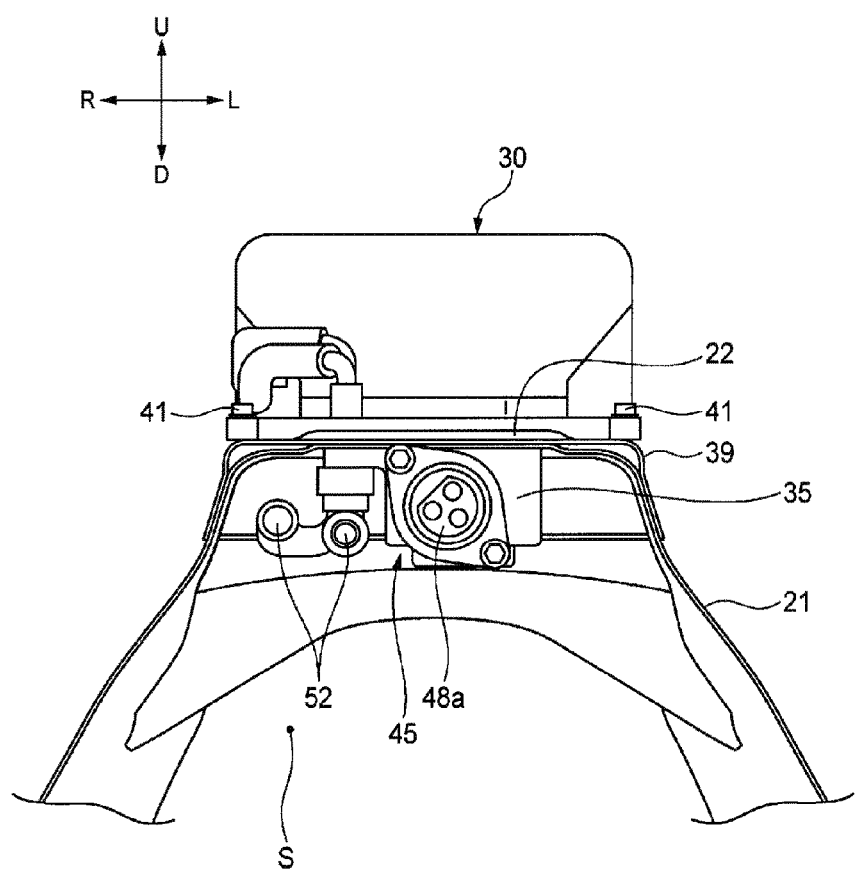
FIG. 6 is a cross-sectional view taken along the line 6-6 in FIG. 2 without showing the exhaust pipe.

Also referring to FIG. 4 and FIG. 6, the cable connector 48a is arranged substantially at the center in a vehicle width direction of a front side face of the front extension portion 35, and the paired pipe connectors 50 are arranged in a slightly-extended step face on a right side of the cable connector 48a in the vehicle width direction. Accordingly, the conductive cable 51 and the two cooling pipes 52, which are respectively connected to the cable connector 48a and the pipe connectors 50 and extend in the vehicle longitudinal direction in alignment with each other in the vehicle width direction, are routed such that the conductive cable 51 is positioned on a left side of the two cooling pipes 52 in the vehicle width direction when seen from the front of the vehicle.

Figure 7:
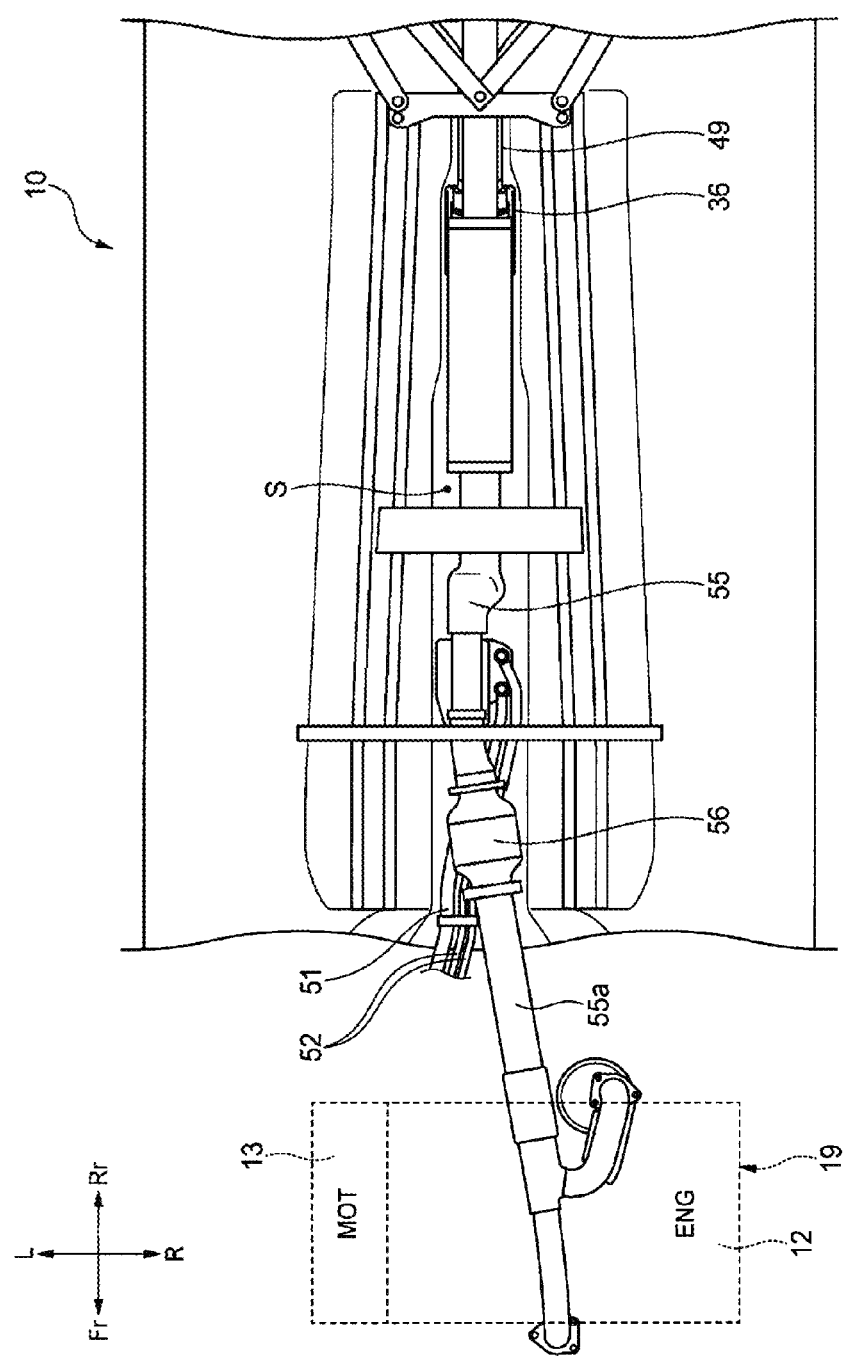
FIG. 7 is a back view of the electric vehicle for showing a positional relationship between the exhaust pipe and the routing member.
Figure 8:
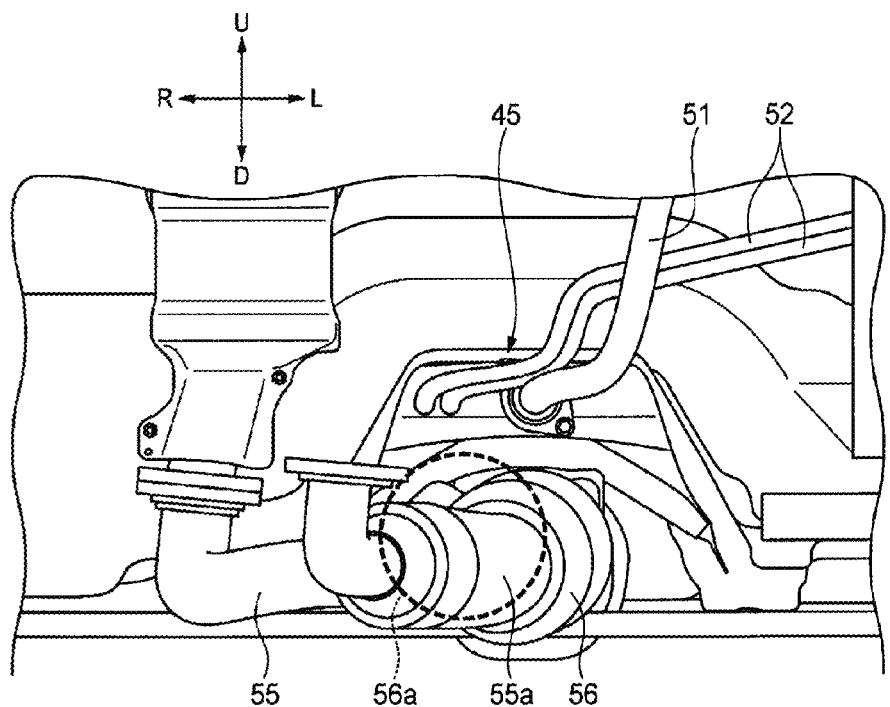
FIG. 8 is a view for showing the positional relationship between the exhaust pipe and the routing member when seen from front.

As shown in FIG. 1 and FIG. 7, under the conductive cables 49, 51 and the cooling pipes 52, an exhaust pipe 55 for discharging exhaust gas of the engine 12 extends in the vehicle 10 longitudinal direction. The exhaust pipe 55 obliquely extends from the engine 12, which is arranged on the right side, to be positioned in the center in the vehicle width direction near under the electric device unit 30, and further extend rearward while being positioned in the center in the vehicle width direction. Also referring to FIG. 8, a catalyst device 56 for purifying the exhaust gas is arranged in the exhaust pipe 55 at a position slightly at the side of the front with respect to the front extension portion 35 of the electric device unit 30.

If a large force acts on the vehicle 10 from the front upon a collision thereof, a front part 55a of the exhaust pipe 55 will be bent to the right and moves upward. Due to the bend of the exhaust pipe 55, the catalyst device 56 also moves to a position 56a indicated by a broken line in the drawing. Since the conductive cable 51 is arranged on the left side of the cooling pipes 52 and thus is arranged in an opposite side (the right side in FIG. 8) from a side to which the exhaust pipe 55 moves in the vehicle width direction. Accordingly, probability of interference of the catalyst device 56 with the cable connector 48a and the conductive cable 51 can be suppressed.

Therefore, short-circuiting between the cable connector 48a and the conductive cable 51 upon the collision of the vehicle 10 can be prevented. Even when the catalyst device 56 is brought into contact with the pipe connector 50 or the cooling pipes 52, only minor failure such as leakage of the cooling water may occur.

As it has been described so far, the electric vehicle 10 according to this embodiment includes: the electric device unit 30 that has the plural electric devices 40 accommodated in the electric device accommodation case 31 and is arranged on the floor panel 20; and the conductive cables 49, 51 and the cooling pipes 52 that respectively extend from the first motor 13, and the second motor 16, and the radiator to be connected to the electric device unit 30. The front-side and rear-side connection portions 45, 46 of the electric device unit 30, which are connected to the conductive cables 49, 51 and the cooling pipes 52, are arranged under the floor panel 20; therefore, the conductive cables 49, 51 and the cooling pipes 52 can easily be connected to the electric device unit 30 from the lower face side of the vehicle 10, and the workability can thereby be improved.

The electric device accommodation case 31 of the electric device unit 30 has: the accommodation portion 34 that accommodates the plural electric devices 40 and is positioned on the floor panel 20; and the front and rear extension portions 35, 36 that respectively penetrate the openings 37, 38 from the accommodation portion 34 to extend under the floor panel 20 and are respectively provided with the front-side and rear-side connection portions 45, 46. Accordingly, the front-side and rear-side connection portions 45, 46, which are respectively provided in the front and rear extension portions 35, 36 in the electric device accommodation case 31, respectively penetrate the openings 37, 38 of the floor panel 20 to be arranged under the floor panel 20. Therefore, work efficiency of connecting the conductive cables 49, 51 and the cooling pipes 52 to the electric device unit 30 can be improved.

Since the front-side and rear-side connection portions 45, 46 are respectively formed such that the connection directions thereof with the conductive cables 49, 51 are parallel and obliquely downward, the floor panel does not become the obstacle, and thus the conductive cables 49, 51 can easily be connected to the electric device unit 30.

The electric device unit 30 is arranged on the top face of the floor tunnel 21 formed by the floor panel 20, and the lower surfaces 35a, 36a of the extension portions 35, 36 of the electric device unit 30 are positioned in the recessed space S configured by the floor tunnel 21. Accordingly, the extension portions 35, 36 are accommodated in the recessed space S of the floor tunnel 21, and thus the electric device unit 30 can be protected by the floor tunnel 21.

The electric device unit 30 is arranged in the central portion in the electric vehicle 10 longitudinal direction. The first motor 13, the second motor 16, and the radiator are respectively arranged in the front and the rear in the electric vehicle 10 longitudinal direction with respect to the electric device unit 30. The front-side connection portion 45 and the rear-side connection portion 46, which are separately provided from each other in the vehicle longitudinal direction with respect to the electric device unit 30, respectively penetrate the front opening 37 and the rear opening 38, which are respectively formed in the front and rear positions of the floor panel 20, to be arranged under the floor panel 20. Accordingly, the first motor 13, the second motor 16, and the radiator can efficiently be connected to the electric device unit 30 by the short conductive cables 49, 51 and the short cooling pipe 52, respectively.

The exhaust pipe 55 for discharging the exhaust gas from the engine 12 is provided under the conductive cable 51 and the cooling pipes 52, which extend in the vehicle 10 longitudinal direction in alignment with each other in the vehicle width direction. When seen in the vehicle 10 longitudinal direction, the conductive cable 51 is arranged on the opposite side of the cooling pipe 52 from the side to which the exhaust pipe 55 moves in the vehicle width direction upon the collision of the vehicle 10. Accordingly, even when the exhaust pipe 55 moves upon the collision of the vehicle 10, the probability of interference of the conductive cable 51 with the catalyst device 56 provided in the exhaust pipe 55 is suppressed. Therefore, damage to the conductive cable 51 can be prevented.

The invention is not limited to the aforementioned embodiment but can appropriately be modified, changed, improved, or the like.

For example, the hybrid automobile has been described as a vehicle to which the invention can be applied; however, the invention is not limited thereto, but may be applied to an electric automobile that only has a motor as a drive source, for example.

In the above embodiment, it has been described that the connection portion is accommodated in the extension portion of the electric device accommodation case and arranged under the floor panel. However, the invention is not limited thereto, and the connection portion may directly be arranged under the floor panel. In this case, as a separate component, it is preferred to provide a cover for covering and protecting the connection portion that is exposed from the floor panel.

The routing member is not limited to the conductive cable connected to the first motor or the second motor or the cooling pipe connected to the radiator, but may be the conductive cable for connecting the electric device unit to the battery.

The arrangement position of the electric device unit is not limited to the top of the floor tunnel at the center in the vehicle width direction but may be on the floor panel under the driver seat or the passenger seat.

The invention is based on Japanese Patent Application (Japanese Patent Application No. 2011-251646) filed on Nov. 17, 2011, which is incorporated herein by reference in its entirety.

DESCRIPTION OF REFERENCE NUMERALS AND SIGNS

10: hybrid automobile (electric vehicle)
11: prime mover compartment (front portion of electric vehicle)
12: engine
13: first motor (external device)
14: motor accommodation compartment (rear portion of electric vehicle)
16: second motor (external device)
18: vehicle cabin (central portion in longitudinal direction of electric vehicle)
20: floor panel
21: floor tunnel
21a: opening position of floor tunnel
30: electric device unit
31: electric device accommodation case
34: accommodation portion
35: front extension portion
35a, 36a: lower surfaces of extension portions
36: rear extension portion
37: front opening
38: rear opening
40: electric device
45: front-side connection portion
46: rear-side connection portion
49, 51: conductive cables (routing members)
52: cooling pipe (routing member)
55: exhaust pipe
S: recessed space

The invention claimed is:

1. An electric vehicle including:
an electric device unit which includes plural electric devices and an electric device accommodation case accommodating the plural electric devices and which is arranged on a floor panel of a vehicle; and
at least one routing member formed of a conductive cable or a cooling pipe which extends from an external device and which is connected to the electric device unit,
wherein an opening is formed in the floor panel at a position where the electric device unit is arranged, and
wherein a connection portion of the electric device unit to which the routing member is connected is arranged under the floor panel.

2. The electric vehicle of claim 1,
wherein the electric device accommodation case includes an accommodation portion which accommodates the plural electric devices and which is positioned on the floor panel and an extension portion which penetrates the opening from the accommodation portion, which extends under the floor panel and to which the connection portion is provided.

3. The electric vehicle of claim 1,
wherein the connection portion is formed such that a connection direction thereof with the routing member is parallel or obliquely downward.

4. The electric vehicle of claim 2,
wherein the electric device unit is arranged on a top face of a floor tunnel which is formed by the floor panel, and wherein a lower face of the extension portion of the electric device unit is positioned in a recessed space configured by the floor tunnel.

5. The electric vehicle of claim 2,
wherein the electric device unit is arranged in a central portion in a vehicle longitudinal direction,
wherein the external device is arranged in a front and a rear in the vehicle longitudinal direction with respect to the electric device unit,
wherein a front opening and a rear opening are formed in the floor panel respectively at a front position and a rear position in a portion where the electric device unit is arranged, and
wherein the connection portion includes a front-side connection portion and a rear-side connection portion which are arranged under the floor panel so as to be separated from each other in the vehicle longitudinal direction with respect to the electric device unit.

6. The electric vehicle of claim 1,
wherein the routing member includes the conductive cable and the cooling pipe which are aligned in a vehicle width direction and which extend in the vehicle longitudinal direction,
wherein an exhaust pipe which discharges exhaust gas from an engine is provided under the conductive cable and the cooling pipe, and,
wherein, when seen in a vehicle longitudinal direction, the conductive cable is arranged on an opposite side of the cooling pipe from a side to which the exhaust pipe moves in the vehicle width direction upon a collision of the vehicle.

\* \* \* \* \*